United States Patent [19]
Fujino et al.

[11] 3,953,350

[45] Apr. 27, 1976

[54] FOAMING BLEACHING COMPOSITION

[75] Inventors: Takashi Fujino, Yokohama; Masaaki Nishimura, Funabashi; Makoto Yamanaka, Koganei, all of Japan

[73] Assignee: Kao Soap Co., Ltd., Tokyo, Japan

[22] Filed: Oct. 21, 1974

[21] Appl. No.: 516,605

[30] Foreign Application Priority Data
Oct. 25, 1973 Japan............................. 48-120245

[52] U.S. Cl.................................. 252/94; 252/99; 252/103; 252/95; 423/582
[51] Int. Cl.².......................... C11D 3/39; C11D 7/54
[58] Field of Search ............... 252/99, 94, 186, 103; 423/582

[56] References Cited
UNITED STATES PATENTS
3,773,678    11/1973    Munday ............................ 252/186

*Primary Examiner*—Mayer Weinblatt
*Attorney, Agent, or Firm*—Woodhams, Blanchard and Flynn

[57] ABSTRACT

A bleaching composition is disclosed characterized by containing sodium percarbonate which was treated by subjecting it to heating at a temperature of 75° to 135°C, for a heating time ranging (1) from 2 to 6 hours at 75°C to (2) 5 to 30 minutes at 135°C.

9 Claims, No Drawings

FOAMING BLEACHING COMPOSITION

BACKGROUND OF THE INVENTION

1. Field of the Invention

This invention relates to a foamable sodium percarbonate bleaching agent having an excellent solution velocity and which foams vigorously when added to water.

2. Description of the Prior Art

There are known both oxygen-type bleaching agents and chlorine-type bleaching agents. In Japan, chlorine-type bleaching agents having an excellent bleaching effect at a low temperature have been in general use. Although the chlorine-type bleaching agents are effective on cellulosic fibers, they have a disadvantage in that they cannot be used for some synthetic fibers because they cause yellow stain damage of synthetic fibers. Another disadvantage of the chlorine-type bleaching agents is that they decolorize dyed clothing made from synthetic fibers.

On the other hand, the oxygen-type bleaching agents have advantages in that they can be used for treating most synthetic fibers in addition to cellulosic fibers, and they can be used safely for dyed clothing, because their bleaching actions are mild.

However, the oxygen-type bleaching agents, a typical example of which is sodium percarbonate, have only a poor solution velocity at low temperatures and therefore a sufficient bleaching power cannot be obtained. Further, because of their poor solution velocity, the remaining undissolved particles of the bleaching agents stick to the fibers and cause partial, excessive bleaching zones, whereby the fibers are damaged and partially decolorized. Accordingly, oxygen-type bleaching agents have been not used in Japan in situations wherein clothes washing is generally effected at a low temperature of about 20°C, although they are effective if they are used for washing at a high temperature of above 60°C. In view of these circumstances, improvements in the solution velocity of oxygen-type bleaching agents has been desired.

SUMMARY OF THE INVENTION

The invention eliminates the above-noted disadvantages of oxygen bleaching agents, and provides a means whereby the solution velocity of sodium percarbonate is improved markedly and the foaming property thereof is improved. We have discovered that by heating sodium percarbonate to a temperature in the range of 75° to 135°C for a predetermined period of time, the solution velocity and foaming property of sodium percarbonate in aqueous solutions is greatly and unexpectedly increased.

This invention provides a foamable bleaching composition having an excellent solution velocity at a low temperature. The bleaching composition contains sodium percarbonate which has been heated at a temperature of 75° to 135°C for a heating time in the range of from (1) for 2 to 6 hours at 75°C, to (2) 5 to 30 minutes at 135°C.

Temperatures not within the above range of 75° to 135°C are unsuitable for the purposes of this invention, because when sodium percarbonate is heated at a temperature below 75°C, the solution velocity of sodium percarbonate is not improved and, when it is heated at a temperature above 135°C, the bleaching power of the sodium percarbonate is reduced and the foaming property is lost substantially.

The length of the time needed to impart the foaming property to sodium percarbonate varies depending upon the heating temperature. Generally, a longer time is required at a lower temperature and a shorter time is required at a higher temperature. Heating times of 2 to 6 hours at 75°C and 5 to 30 minutes at 135°C are effective. When a heating time shorter than the above-stated range is employed, the resulting sodium percarbonate is not foamable. On the other hand, when the heating time is longer than said range, the foaming property disappears and further the bleaching power is reduced. The reason for the latter defect is considered to be that a substantial portion or all of the sodium percarbonate is converted to sodium carbonate during the heating for longer than the specified maximum time.

When heating temperatures between the limits of 75°C and 135°C are used, the heating time is determined by interpolation. For a general purpose household bleaching agent, sodium percarbonate which has been heated at 100° to 110°C for about 1.5 hours is preferred.

Sodium percarbonate of this invention which is treated with heat is the same substance as that which has not been heated. The difference of the two, however, is in that the treatment of heat has sodium percarbonate hold oxygen molecules in its crystal lattice. And the sodium percarbonate releases the oxygen molecules in order to foam when it is based in water.

The heated sodium percarbonate was analysed with Raman spectrometry, when showed that the heated sodium percarbonate had a characteristic absorption at the wave number of 1550 cm$^{-1}$ corresponding to that of oxygen molecule, but sodium percarbonate not heated was not found to have the same absorption.

The bleaching composition of the present invention can also contain, if necessary or desired, added water-soluble inorganic builder and filler salts such as sodium sulfate, sodium carbonate and sodium silicate. Further, the composition can be transformed to a bleaching detergent composition by adding thereto, alone or in addition to the said salts, an anionic surfactant, nonionic surfactant or amphoteric surfactant of the water-soluble types conventionally used for household clothes washing purposes. A similar effect can be obtained by subjecting the composition, containing the additive substances, to a heat treatment at a temperature of 75° to 135°C after incorporation of those additives to sodium percarbonate. The heat treated percarbonate comprises at least 5 weight percent of the composition, preferably from 10 to 90 weight percent, and the balance consists essentially of one or more of the builder salts, fillers salts and surfactants.

The composition to be employed as a bleaching agent is preferred to comprise 30 to 90 weight per cent of heat-treated percarbonate, 3 to 10 per cent of surfactants, 6 to 30 per cent of inorganic builders and filler salts and 1 to 3 per cent of other additives such as fluorescent dyes, perfumes, stain-preventing agents and enzymes. The composition to be employed as a detergent is preferred to comprise 10 to 35 weight per cent of heat-treated percarbonate, 5 to 30 per cent of surfactants, 30 to 60 per cent of inorganic builders and filler salts and 1 to 5 per cent of other additives.

The bleaching composition of this invention can be prepared in particulate or powder form, and packaged and used in the conventional manner.

The bleaching composition of this invention has a special effect in that the composition dissolves rapidly to produce foams even at a low temperature. This special property is particularly marked if the composition is in the form of tablets which can be made in the conventional manner in the conventional shapes.

In general, when a bleaching or bleaching detergent composition is used in the form of tablets, improvements in the disintegrating property of the tablets have been obtained by employing a disintegrator or solubilization-promoting agent in a large amount or a foaming agent recipe, such as a combination of sodium bicarbonate and an organic acid, to improve the solubility of the composition in water.

However, when these conventional disintegrators are used, the bleaching effect is reduced accordingly and the cost of the tablets is increased, because such additives do not contribute to the effect of the active ingredient. According to the present invention wherein the novel foaming sodium percarbonate is used, the improved solution velocity and disintegrating property of the tablet-type bleaching agent can be accomplished without incurring a reduction in the bleaching power or an elevation of the cost, because the bleaching agent per se acts also as foaming agent.

Furthermore, the foaming sodium percarbonate of the present invention can be used with dyes, fluorescent dyes, bathing salts, dentifrices, cleaners and soaps in the form of tablets to improve their disintegrating property and solution velocity and to impart foaming properties to them, thereby increasing their commercial value.

The aqueous bleaching solution useful for household laundry purposes for bleaching clothes is prepared by dissolving the bleaching composition in water in an amount such that the concentration of the heat-treated sodium percarbonate is from 0.001 to 5.0 weight percent, based on the aqueous bleaching solution. It must be prepared just before its usage.

The heat-treated sodium percarbonate, according to the invention, is altered by the heat treatment so as to have improved solution velocity and foaming property in comparison with the non-heat-treated sodium percarbonate. It has not been possible thus far to ascertain the physical and/or chemical changes that take place during the heat treatment because the fragility of this compound complicates identification of various phases of the system $Na_2CO_3$-$H_2O_2$-$H_2O$.

EXAMPLE 1

The effects of heat treatment of sodium percarbonate ($2Na_2CO_3 \cdot 3H_2O_2$) on its solution velocity were examined.

Sodium percarbonate powders (10 to 100 mesh size) were subjected to heat treatment at various temperatures for various heating times. A 500 ml beaker was charged with 300 ml of city water. Three grams of the respective sodium percarbonate samples were added thereto with slow stirring at room temperature (25°C). The solution times required until the particles completely disappeared were measured and the foaming activities were examined. The results are given in Table 1.

Table 1

| Heating temperature | Heating time | Solution time | Foaming property |
|---|---|---|---|
| 65°C | 1.5 hrs. | 3 mins. | No foaming (control) |
| 80°C | 1.5 hrs. | 1 min. | Foaming (control) |
| 105°C | 1.5 hrs. | 10 secs. | Vigorous foaming (invention) |
| 130°C | 1.5 hrs. | 3 mins. 20 secs. | Substantially no foaming (control) |
| 150°C | 1.5 hrs. | 3 mins. 20 secs. | No foaming (control) |
| 80°C | 4 hrs. | 20 secs. | Vigorous foaming (invention) |
| 80°C | 30 mins. | 1 min 50 secs. | Slight foaming (control) |
| 130°C | 10 mins. | 15 secs. | Vigorous foaming (invention) |
| Untreated | — | 3 mins. | No foaming (control) |

EXAMPLE 2

Twenty parts by weight of sodium percarbonate powder treated at 105°C for 1.5 hours (the same powder as in Example 1) were mixed with 80 parts by weight of a detergent composition having a composition as shown below and the mixture was molded into tablets of bleaching detergent.

| Detergent composition | parts by weight |
|---|---|
| Sodium alkylbenzenesulfonate | 10 |
| Sodium alkyl sulfate | 5 |
| Sodium α-olefin sulfonate | 3 |
| Sodium tripolyphosphate | 25 |
| Sodium silicate, sodium carbonate | 8 |
| Sodium sulfate | 36.3 |
| Water | 10 |
| Soap and perfume | 2.7 |

As a control, tablets were prepared from a mixture of 20 parts by weight of sodium percarbonate which had not been heat-treated and 80 parts by weight of the same detergent composition, and the solution velocities thereof of the respective compositions were determined.

The test method comprised introducing two tablets of 7.0 mm diameter in 30 ml. of water at ambient (25°C) temperature and allowing the whole to stand. The time required for complete disintegration of the tablets was measured.

The tablets containing the heat treated sodium percarbonate powder, according to the present invention, disintegrated completely and dissolved after about 30 minutes, while the control tablets did not disintegrate completely even after 10 hours.

EXAMPLE 3

Eighty parts by weight of the detergent composition used in Example 2 were mixed with 20 parts by weight of sodium percarbonate which had not been heat-treated. From the mixture, similar tablets were prepared. The tablets were then heat-treated at 105°C for 1.5 hours.

The solubility test of the heat-treated tablets and also the non-heat-treated tablets was carried out for comparison.

The test method comprised introducing two tablets of 7.0 mm diameter into 300 ml. of water at ambient (25°C) temperature in the same manner as in Example 1 and stirring the whole slowly. The time required for the complete solution or disappearance of the tablets was measured.

The heat-treated product of the present invention disintegrated and dissolved completely within 5 minutes, while the non-heat-treated product required about 18 minutes for solution and disappearance.

This confirms experimentally that the compositions or the tablets containing heat-treated sodium percarbonate and other ingredients have improved solubilities.

The embodiments of the invention in which an exclusive property or privilege is claimed are defined as follows:

1. Sodium percarbonate which has been heated at a temperature of from 75° to 135°C, for a heating time in the range of from (1) 2 to 6 hours at 75°C, to (2) 5 to 30 minutes at 135°C.

2. A composition consisting essentially of from 10 to 90 weight percent of the sodium percarbonate of claim 1, and the balance is one or more of water-soluble builder salts, water-soluble filler salts and water-soluble clothes-washing surfactants.

3. A bleaching composition consisting essentially of
   1. from 30 to 90 weight percent of the sodium percarbonate of claim 1,
   2. from 3 to 10 weight percent of water-soluble clothes-washing surfactant, and
   3. from 6 to 30 weight percent of water-soluble inorganic builder and filler salts.

4. A bleaching composition as claimed in claim 3, in the form of a tablet.

5. A bleaching detergent composition consisting essentially of
   1. 10 to 35 weight percent of the sodium percarbonate of claim 1,
   2. from 5 to 30 weight percent of water-soluble clothes-washing surfactant, and
   3. from 30 to 60 weight percent of water-soluble inorganic builder and filler salts.

6. A bleaching detergent composition as claimed in claim 5, in the form of a tablet.

7. A method of preparing sodium percarbonate that possesses a foaming property and an increased velocity of dissolving in water, which consists essentially of heating sodium percarbonate at a temperature in the range of 75° to 135°C, for a heating time ranging from (1) 2 to 6 hours at 75°C to (2) 5 to 30 minutes at 135°C.

8. A method as claimed in claim 7, in which the sodium percarbonate contains mixed therein water-soluble clothes-washing surfactant, or water-soluble inorganic builder and filler salts, or mixtures thereof.

9. A method as claimed in claim 7 in which the sodium percarbonate is heated at 100° to 110°C for 1.5 hours.

* * * * *